United States Patent
Smith et al.

(10) Patent No.: US 11,845,321 B2
(45) Date of Patent: Dec. 19, 2023

(54) VEHICLE THERMAL MANAGEMENT AT CONDENSERS OF THE REFRIGERANT LOOP

(71) Applicant: GM Global Technology Operations LLC, Detroit, MI (US)

(72) Inventors: Cameron P. Smith, Milford, MI (US); Lawrence P. Ziehr, Clarkston, MI (US); Nathan J. English, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 258 days.

(21) Appl. No.: 16/894,137

(22) Filed: Jun. 5, 2020

(65) Prior Publication Data
US 2021/0379959 A1    Dec. 9, 2021

(51) Int. Cl.
*B60H 1/00*   (2006.01)
*B60H 1/32*   (2006.01)
*B60H 1/22*   (2006.01)

(52) U.S. Cl.
CPC ....... *B60H 1/0073* (2019.05); *B60H 1/00007* (2013.01); *B60H 1/00278* (2013.01);
(Continued)

(58) Field of Classification Search
CPC .............. B60H 1/0073; B60H 1/00007; B60H 1/00278; B60H 1/00642; B60H 1/00735;
(Continued)

(56) References Cited

U.S. PATENT DOCUMENTS

| | | | | |
|---|---|---|---|---|
| 6,035,651 A | * | 3/2000 | Carey | F25B 1/047 62/204 |
| 10,661,629 B2 | * | 5/2020 | Craig | B60H 1/00378 |

(Continued)

FOREIGN PATENT DOCUMENTS

| | | |
|---|---|---|
| CN | 202141239 U | 2/2012 |
| CN | 107449266 A | 12/2017 |

(Continued)

OTHER PUBLICATIONS

Google machine translation of Chinese Office Action for Application No. 2023110339071.4, dated Aug. 31, 2023. [retrieved on Oct. 17, 2023]. Retrieved from the Internet: <https://pro-db-1.uspto.gov/stic/upload/715973/CN202110339071.4_OA.google.en.pdf>.*

(Continued)

*Primary Examiner* — Ljiljana V. Ciric
(74) *Attorney, Agent, or Firm* — CANTOR COLBURN LLP

(57) ABSTRACT

Thermal management in a vehicle involves a compressor to output a refrigerant in vapor form for circulation in a refrigerant loop. A thermal management system includes a heating, ventilation, and air conditioning system in the refrigerant loop including an evaporator and an HVAC condenser, and an exterior condenser in the refrigerant loop configured to vent heat to an exterior of the vehicle. A first variable refrigerant flow valve controls a flow rate of the refrigerant output by the compressor into the HVAC condenser, and a second refrigerant flow valve controls a flow rate of the refrigerant output by the compressor into the exterior condenser. A controller controls the first refrigerant flow valve and the second refrigerant flow valve based on a target output temperature for the HVAC condenser.

10 Claims, 3 Drawing Sheets

(52) U.S. Cl.
CPC ..... *B60H 1/00642* (2013.01); *B60H 1/00735* (2013.01); *B60H 1/00764* (2013.01); *B60H 1/00878* (2013.01); *B60H 1/00885* (2013.01); *B60H 1/00921* (2013.01); *B60H 1/22* (2013.01); *B60H 1/323* (2013.01); *B60H 1/3205* (2013.01); *B60H 1/3213* (2013.01); *B60H 2001/00307* (2013.01); *B60H 2001/00949* (2013.01); *B60H 2001/3279* (2013.01)

(58) Field of Classification Search
CPC ............ B60H 1/00764; B60H 1/00878; B60H 1/00885; B60H 1/00921; B60H 1/22; B60H 1/3205; B60H 1/3213; B60H 1/323; B60H 2001/00307; B60H 2001/00949; B60H 2001/3279
See application file for complete search history.

(56) References Cited

U.S. PATENT DOCUMENTS

| 11,433,738 B2* | 9/2022 | Groen | B60H 1/2221 |
| 2012/0222438 A1* | 9/2012 | Osaka | B60H 1/00764 62/126 |
| 2015/0013367 A1* | 1/2015 | Carpenter | F25B 49/02 62/222 |
| 2019/0176578 A1* | 6/2019 | Blatchley | B60H 1/323 |
| 2019/0308489 A1* | 10/2019 | Spies | B60H 1/00485 |
| 2020/0313255 A1* | 10/2020 | Wu | H01M 10/615 |
| 2021/0370748 A1* | 12/2021 | Groen | B60H 1/32281 |

FOREIGN PATENT DOCUMENTS

| DE | 112019003105 T5 * | 4/2021 | ........... B60H 1/3211 |
| DE | 102021107776 A1 * | 12/2021 | ......... B60H 1/00007 |
| DE | 112021001328 T5 * | 12/2022 | ......... B60H 1/00328 |
| WO | WO-2013148034 A1 * | 10/2013 | ......... B60H 1/00278 |

OTHER PUBLICATIONS

ESPACENET machine translation of CN 202141239 U., dated Feb. 8, 2012. [retrieved on Oct. 17, 2023]. Retrieved from the Internet: <https://pro-db-1.uspto.gov/stic/upload/715974/CN202141239U_MT.pdf>.*

ESPACENET machine translation of CN 107449266 A., dated Dec. 8, 2017. [retrieved on Oct. 17, 2023]. Retrieved from the Internet: <https://pro-db-1.uspto.gov/stic/upload/715975/CN107449266A_MT.pdf >.*

Chinese Office Action for Application No. 202110339071.4 dated Aug. 31, 2023, 11 pp.

* cited by examiner

VEHICLE THERMAL MANAGEMENT AT CONDENSERS OF THE REFRIGERANT LOOP

INTRODUCTION

The subject disclosure relates to vehicle thermal management at the condensers of the refrigerant loop.

Vehicles (e.g., automobiles, trucks, construction equipment, farm equipment, automated factory equipment) include components that generate heat as well as components that require heat. The heat may be used in heat transfer devices that serve different functions. In vehicles with one or more occupants, a heat transfer device may be used to manage the temperature and humidity in the passenger compartment, for example. Accordingly, it is desirable to provide vehicle thermal management at the condensers of the refrigerant loop.

SUMMARY

In one exemplary embodiment, a thermal management system in a vehicle includes a compressor to output a refrigerant in vapor form for circulation in a refrigerant loop. The system also includes a heating, ventilation, and air conditioning (HVAC) system in the refrigerant loop including an evaporator and an HVAC condenser, and an exterior condenser in the refrigerant loop configured to vent heat to an exterior of the vehicle. A first variable refrigerant flow valve (RFV) controls a flow rate of the refrigerant output by the compressor into the HVAC condenser, and a second RFV controls a flow rate of the refrigerant output by the compressor into the exterior condenser. A controller controls the first RFV and the second RFV based on a target output temperature for the HVAC condenser.

In addition to one or more of the features described herein, the target output temperature for the HVAC condenser is based on an occupant selection of a temperature for a passenger cabin of the vehicle.

In addition to one or more of the features described herein, the controller controls the first RFV to maintain a subcooling of the HVAC condenser in a predefined range, the subcooling being a temperature decrease of the refrigerant in a liquid phase.

In addition to one or more of the features described herein, the controller determines if the evaporator, the HVAC condenser, and the exterior condenser are all operational.

In addition to one or more of the features described herein, the controller determines if a temperature of an output of the HVAC condenser is greater than the target output temperature.

In addition to one or more of the features described herein, based on determining that the temperature of the output of the HVAC condenser is not greater than the target output temperature, the controller closes the second RFV to decrease a flow rate of the refrigerant into the exterior condenser.

In addition to one or more of the features described herein, based on determining that the temperature of the output of the HVAC condenser is greater than the target output temperature, the controller opens the second RFV to increase a flow rate of the refrigerant into the exterior condenser.

In addition to one or more of the features described herein, the controller controls a speed at which the second RFV is opened based on a temperature outside the vehicle.

In addition to one or more of the features described herein, the system also includes a fan to increase heat transfer from the exterior condenser to outside the vehicle.

In addition to one or more of the features described herein, the controller controls a speed of the fan based on a speed of the vehicle.

In another exemplary embodiment, a method of performing thermal management in a vehicle includes obtaining a passenger cabin temperature setting. The method also includes determining a target output temperature for a heating, ventilation, and air conditioning (HVAC) condenser that is part of an HVAC system in a refrigerant loop based on the temperature setting. A first variable refrigerant flow valve (RFV) that controls a flow rate of the refrigerant into the HVAC condenser and a second RFV that controls a flow rate of the refrigerant into an exterior condenser in the refrigerant loop to vent heat to an exterior of the vehicle are controlled.

In addition to one or more of the features described herein, the obtaining the temperature setting is based on an occupant selection of a temperature for the passenger cabin of the vehicle via an occupant interface.

In addition to one or more of the features described herein, the method also includes controlling the first RFV to maintain a subcooling of the HVAC condenser in a predefined range, the subcooling being a temperature decrease of the refrigerant in a liquid phase.

In addition to one or more of the features described herein, the method also includes determining if an evaporator of the HVAC system, the HVAC condenser, and the exterior condenser are all operational.

In addition to one or more of the features described herein, the method also includes determining if a temperature of an output of the HVAC condenser is greater than the target output temperature.

In addition to one or more of the features described herein, the method also includes, based on determining that the temperature of the output of the HVAC condenser is not greater than the target output temperature, closing the second RFV to decrease the flow rate of the refrigerant into the exterior condenser.

In addition to one or more of the features described herein, the method also includes, based on determining that the temperature of the output of the HVAC condenser is greater than the target output temperature, opening the second RFV to increase the flow rate of the refrigerant into the exterior condenser.

In addition to one or more of the features described herein, the method also includes controlling a speed at which the second RFV is opened based on a temperature outside the vehicle.

In addition to one or more of the features described herein, the method also includes controlling a fan configured to increase heat transfer from the exterior condenser to outside the vehicle.

In addition to one or more of the features described herein, the controlling the fan is based on a speed of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
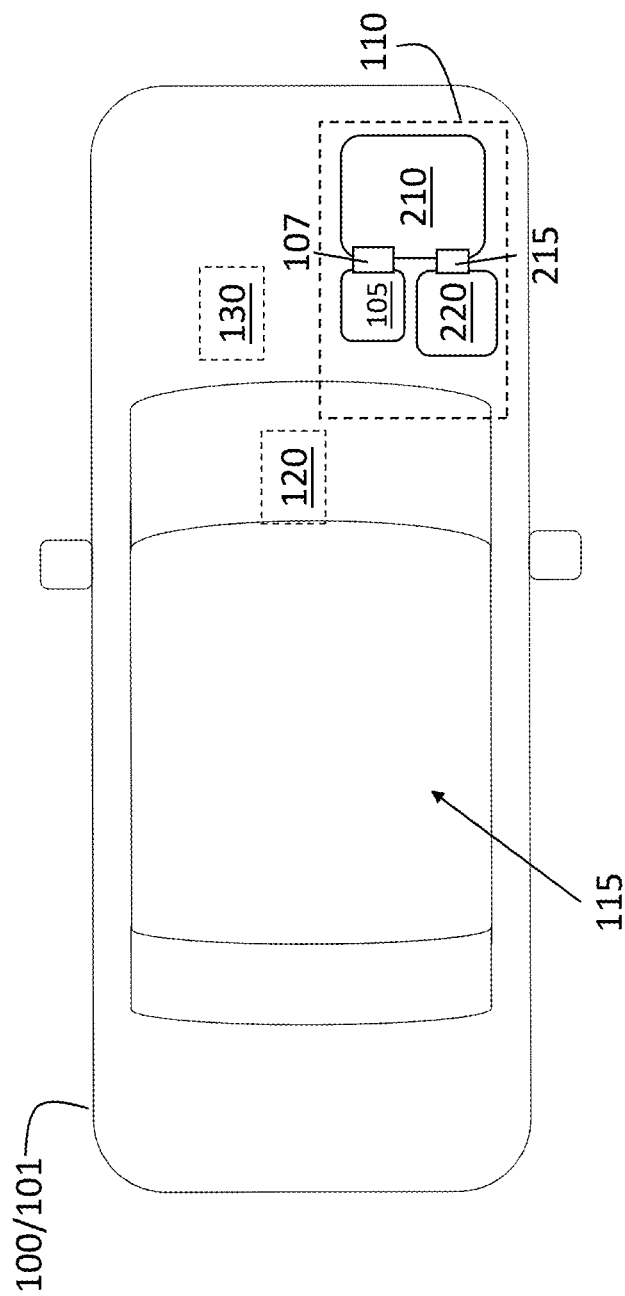
FIG. 1 is a block diagram of an exemplary vehicle in which thermal management of condensers of the refrigerant loop is implemented according to one or more embodiments.

The following description is merely exemplary in nature and is not intended to limit the present disclosure, its application or uses. It should be understood that throughout the drawings, corresponding reference numerals indicate like or corresponding parts and features.

As previously noted, vehicles include both heat-generating components and those that use the heat in a heat transfer device. The passenger cabin temperature management, for example, employs a heat transfer device that requires heat to produce the requisite phase change. A significant percentage of the output of a traditional internal combustion engine is in the form of heat. However, this waste heat is less readily available in a hybrid or electric vehicle (EV) due to their increased efficiency. Other exemplary sources of waste heat in an EV include resistive loses of power electronics. Embodiments of the systems and methods detailed herein relate to vehicle thermal management of condensers of the refrigerant loop.

A thermal system architecture has been developed to collect, store, and distribute thermal energy to vehicle systems that need the energy. The architecture includes three thermal fluid loops: a coolant loop that circulates coolant, a drive unit oil loop that circulates transmission oil, and a refrigerant loop that circulates a refrigerant. The coolant loop interacts with both the drive unit oil loop and the refrigerant loop. Embodiments detailed herein pertain to the control of condensers in the refrigerant loop based on control of the flow rate of a compressor output to each condenser.

In accordance with an exemplary embodiment, FIG. 1 is a block diagram of a vehicle 100 in which thermal management is implemented at the condensers 275, 285 (FIG. 2) of the refrigerant loop 220. The exemplary vehicle 100 shown in FIG. 1 is an automobile 101. The thermal management system 110 that includes the three previously noted thermal fluid loops is indicated. Specifically, a coolant loop 210 interacts with both a refrigerant loop 220 and a drive unit oil loop 105. A transmission oil cooler 107 is at an intersection of the coolant loop 210 and the drive unit oil loop 105, and a chiller 215 is at an intersection of the coolant loop 210 and the refrigerant loop 220. An occupant interface 120 (e.g., infotainment system) facilitates selections by an occupant of the vehicle 100 in the passenger compartment 115. The input may be a desired temperature for the passenger compartment 115, for example. The inputs to the occupant interface 120 may be implemented through a controller 130 (e.g., electronic control unit (ECU)) of the vehicle 100.

The controller 130 may control aspects of the thermal management system 110 as well as other operations of the vehicle 100. For example, the controller 130 may implement autonomous or semi-autonomous (e.g., automatic braking, adaptive cruise control) operation based on interaction with other systems of the vehicle 100. Based on an input at the occupant interface 120 (e.g., a temperature selection), the controller 130 may control aspects of the thermal management system 110, as further discussed with reference to FIGS. 2 and 3. The controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
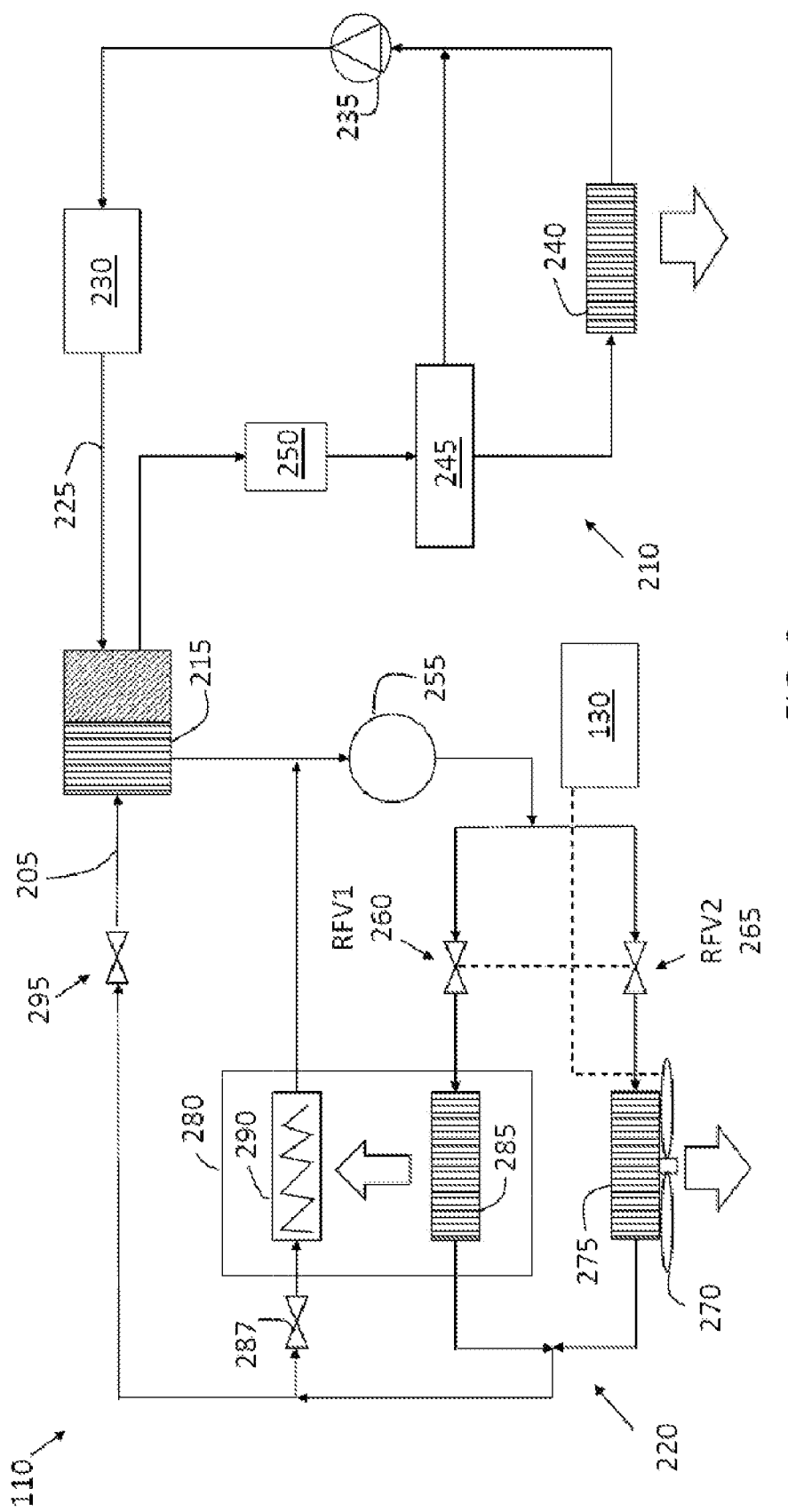
FIG. 2 is a block diagram of aspects of the thermal management system that is controlled according to one or more embodiments.

FIG. 2 is a block diagram of aspects of the thermal management system 110 that controls the HVAC condenser 285 and exterior condenser 275 of the refrigerant loop 220 according to one or more embodiments. The control may be provided by the controller 130 or another controller that is specific to the thermal management system 110 and includes processing circuitry similar to that discussed with reference to the controller 130. Relevant aspects of the coolant loop 210 and the refrigerant loop 220 are shown. Details of the drive unit oil loop 105 and the aspects of the coolant loop 210 that interact with it are not shown. For example, the coolant loop 210 may include an integrated power electronic module with accessories (e.g., high voltage supply, navigation system, heated seat system) or an onboard charging module that moves energy into a secondary cell or rechargeable battery 250. As shown, the coolant loop 210 includes a battery 250 for the drivetrain and other drivetrain components 245 that may generate waste heat. A radiator 240 may transfer thermal energy to the outside of the vehicle 100 when too much waste heat is generated to be stored. A coolant pump 235 may be controlled to selectively pump coolant 225 that is heated by the waste heat as it flows to the coolant pump 235 in the coolant loop 210.

As previously noted, a chiller 215 is at an intersection of the coolant loop 210 and the refrigerant loop 220 and acts as a heat exchange device between the two. The coolant 225 pumped by the coolant pump 235 is input to one side of the chiller 215. Refrigerant 205 is input to another side of the chiller 215. Exemplary, non-limiting refrigerants 205 include hydrofluorocarbon (HFC-134a) or hydrofluoroolefin (HFO-1234yf). The coolant 225 and refrigerant 205 do not mix in the chiller 215, but the flow of each through the separate sides allows the refrigerant loop 220 to carry thermal energy to or from the coolant loop 210 via the chiller 215. As previously noted, the flow rate of coolant 225 into the chiller 215 is controlled via the coolant pump 235. The flow rate of refrigerant 205 into the chiller 215 is controlled via an electronic expansion valve (EXV) 295.

The refrigerant loop 220 includes an HVAC system 280 that provides heated or cooled air to the passenger compartment 115. The HVAC system 280, which is an air conditioner in which both heating and cooling functions are possible, includes an HVAC condenser 285 and an evaporator 290. An EXV 287 controls the flow of refrigerant into the evaporator 290. The refrigerant loop 220 also includes an exterior condenser 275 with a fan 270. The fan 270 may be shared with the radiator 240. Refrigerant 205 from the evaporator 290 and the chiller 215 enters a compressor 255, as shown in FIG. 2. The compressor 255 increases the pressure and temperature of the refrigerant 205. This higher-temperature and higher-pressure refrigerant 205 may enter the HVAC condenser 285 of the HVAC system 280, the exterior condenser 275, or both. The flow of refrigerant 205 from the compressor 255 is controlled based on control of the variable refrigerant flow valves (RFVs). Specifically, RFV1 260 controls the flow of refrigerant 205 into the HVAC condenser 285, and RFV2 265 controls the flow of refrigerant 205 into the exterior condenser 275. The exterior condenser 275 is used to transfer heat to the outside of the vehicle 100.

When the ambient temperature outside the vehicle 100 is very cold and heat is requested in the passenger compartment 115, the evaporator 290 of the HVAC system 280 may not be operated. When the ambient temperature is very hot and dry, the HVAC condenser 285 of the HVAC system 280 may not be operated. However, at milder ambient temperatures and to balance humidity in the passenger compartment 115, both the HVAC condenser 285 and the evaporator 290 may be operated. In this case, control of the HVAC condenser 285 is more challenging and requires managing the control of RFV1 260 and RFV2 265, as further discussed with reference to FIG. 3.

Figure 3:
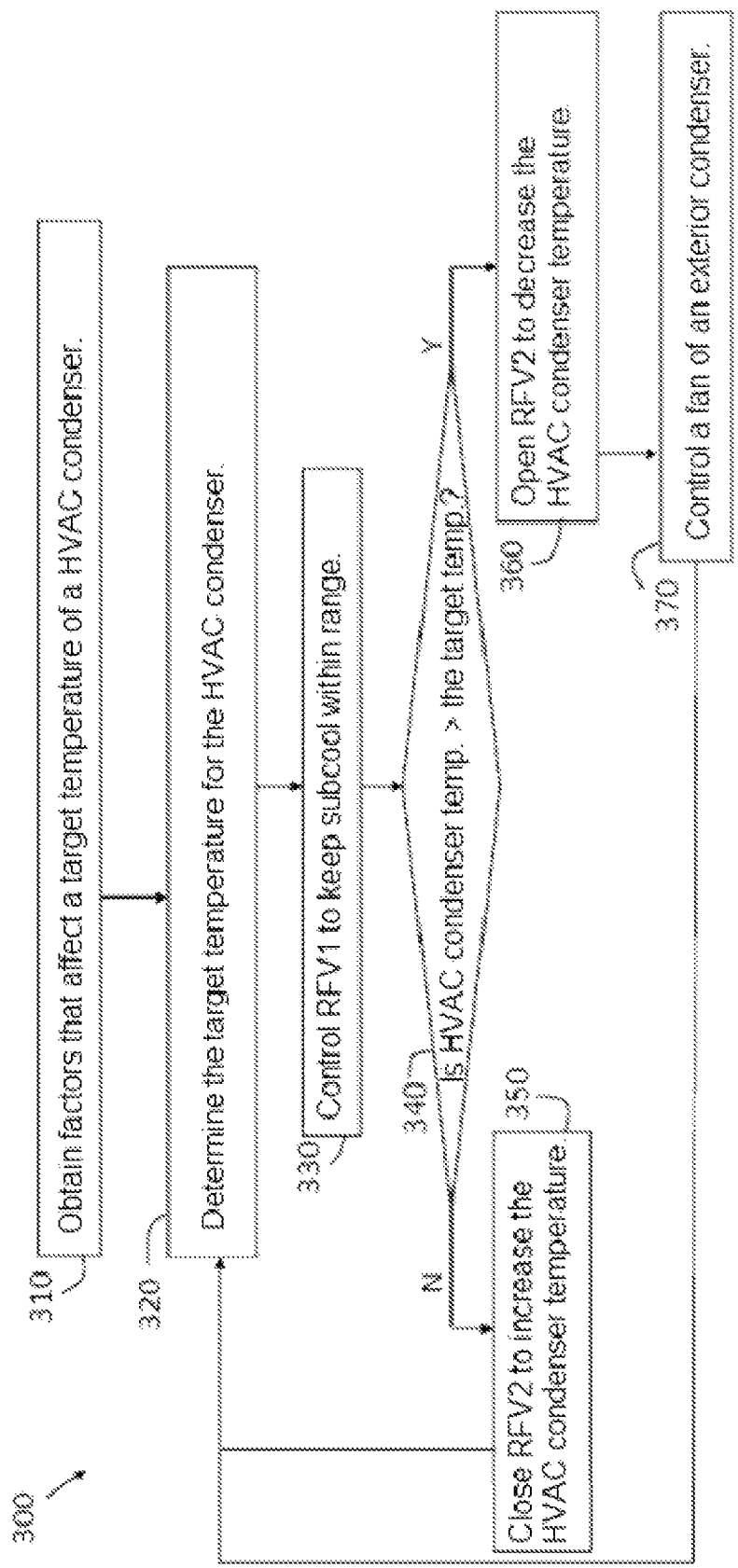
FIG. 3 is a process flow of a method of controlling the thermal management system that controls the HVAC condenser and exterior condenser according to one or more embodiments.

FIG. 3 is a process flow of a method 300 of performing thermal management of the HVAC condenser 285 and exterior condenser 275 of the refrigerant loop 220 according to one or more embodiments. The thermal management detailed herein is implemented by the controller 130 or other processing circuitry through control of RFV1 260 and RFV2 265. Specifically, the processes in FIG. 3 control the flow of refrigerant 205, which is output from the compressor 255 in vapor form, into each of the HVAC condenser 285 and exterior condenser 275. The control is based on controlling RFV1 260 and RFV2 265. As previously noted, a threshold condition for performing the method 300 is a determination that current conditions require operation of the evaporator 290 and both the HVAC condenser 285 and exterior condenser 275 at the same time.

At block 310, factors that affect a target temperature for the HVAC condenser 285 are obtained by the controller 130 or other processing circuitry that determines the control of RFV1 260 and RFV2 265. Exemplary factors include the cabin air temperature that is set or changed via the occupant interface 120, the temperature outside the vehicle 100, and the speed of the vehicle 100. At block 320, determining a target temperature for the HVAC condenser 285 refers to obtaining the current temperature setting for passenger cabin 115. That is, the target temperature is the temperature of the output from the HVAC condenser 285 that is needed to achieve the setting input to the occupant interface 120 for the temperature of the passenger cabin 115. Because humidity in the passenger cabin 115 must be controlled in addition to achieving the desired temperature, the factors obtained at block 310 may be used to compute the target temperature. Computation of this target temperature is known and not further detailed herein. Whenever the process of determining the target temperature at block 320 is repeated, the most current information about factors is obtained from block 310.

At block 330, the processes include controlling RFV1 260 to keep subcooling within a predefined range. The term "subcooling" refers to how much the temperature of the refrigerant 205 exiting the HVAC condenser 285 is below the temperature needed to achieve the vapor to liquid phase change in the HVAC condenser 285. If the subcooling were 0 degrees, it means that only the minimum cooling needed to cause the phase change of the refrigerant 205 in the HVAC condenser 285 was used. That is, a positive subcooling is the temperature decrease of the refrigerant 205 in the liquid phase. Keeping the subcooling within a specified range by controlling a flow of refrigerant 205 into the HVAC condenser 285 using RFV1 260 prevents inefficient operation of the refrigerant system. At block 340, a check is done of whether the temperature of the HVAC condenser 285 is above the target temperature determined at block 320.

If the temperature of the output by the HVAC condenser 285 is not above the target temperature determined at block 320, then closing the RFV2 265 is controlled at block 350. This is because the check at block 340 indicates that increased temperature of the refrigerant 205 output by the compressor 255 is needed in the HVAC condenser 285. That is, by decreasing the flow of refrigerant 205 to the exterior condenser 275 through RFV2 265 while holding RFV1 260 unchanged, the pressure of the refrigerant 205 exiting the compressor 255 increases, thereby increasing its temperature. Following the adjustment of RFV2 265, the target temperature is determined again at block 320 and subcooling is controlled at block 330 in the next iteration.

If, instead, the check at block 340 indicates that the temperature of the output by the HVAC condenser 285 is above the target temperature determined at block 320, then the processes at block 360 are performed. The temperature of the output of the HVAC condenser 285 being above the target temperature, as determined at block 340, indicates that the temperature of the refrigerant 205 vapor from the compressor 255 into the HVAC condenser 285 may be reduced. At block 360, this temperature decrease in the refrigerant 205 is achieved by opening RFV2 265 to decrease the pressure and, thus, the temperature of the refrigerant 205 vapor output by the compressor 255. The speed at which the RFV2 265 is opened is based on the outside temperature, obtained at block 310. That is, the hotter the temperature outside the vehicle 100, the less heat is transferred from the refrigerant 205 in the exterior condenser 275. Thus, the RFV2 265 is opened more quickly for a given iteration of the processes when the outside temperature is higher.

At block 370, the processes include controlling the fan 270 of the exterior condenser 275, which may be shared with the radiator 240 as previously noted. The control of the fan 270, at block 370, may be based on the speed of the vehicle 100, which is obtained at block 310. This is because more heat is dissipated at higher speeds of the vehicle 100. Thus, the speed of the fan 270 may be decreased as the speed of the vehicle 100 increases to maintain the same heat dissipation from the exterior condenser 275. Following the control to increase the flow of refrigerant 205 into the exterior condenser 275, at block 360, and the control of the fan 270, at block 370, the next iteration begins at block 320 with an update of the target temperature in case any of the factors obtained at block 310 have changed.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A thermal management system in a vehicle comprising:
a compressor configured to output a refrigerant in vapor form for circulation in a refrigerant loop;
a heating, ventilation, and air conditioning system in the refrigerant loop including an evaporator and an HVAC condenser;
an exterior condenser in the refrigerant loop configured to vent heat to an exterior of the vehicle;
a first variable refrigerant flow valve in the refrigerant loop, the first variable refrigerant flow valve configured to control a flow rate of the refrigerant output by the compressor into the HVAC condenser;

a second variable refrigerant flow valve in the refrigerant loop, the second variable refrigerant flow valve configured to control a flow rate of the refrigerant output by the compressor into the exterior condenser; and a controller configured to control the first variable refrigerant flow valve and the second variable refrigerant flow valve based on a target output temperature for the HVAC condenser.

2. The system according to claim 1, wherein the target output temperature for the HVAC condenser is based on an occupant selection of a temperature for a passenger cabin of the vehicle.

3. The system according to claim 1, wherein the controller is configured to control the first variable refrigerant flow valve RFV to maintain a subcool value subcooling of the HVAC condenser in a predefined range, the subcool value subcooling being a temperature decrease of the refrigerant in a liquid phase.

4. The system according to claim 1, wherein the controller is configured to determine whether the evaporator, the HVAC condenser, and the exterior condenser are all operational.

5. The system according to claim 4, wherein the controller is configured to determine if a whether the temperature of an output of the HVAC condenser is greater than the target output temperature.

6. The system according to claim 5, wherein, based on determining that the temperature of the output of the HVAC condenser is not greater than the target output temperature, the controller is configured to close the second variable refrigerant flow valve to decrease a flow rate of the refrigerant into the exterior condenser.

7. The system according to claim 5, wherein, based on determining that the temperature of the output of the HVAC condenser is greater than the target output temperature, the controller is configured to open the second variable refrigerant flow valve to increase a flow rate of the refrigerant into the exterior condenser.

8. The system according to claim 7, wherein the controller is further configured to control a speed at which the second variable refrigerant flow valve is opened based on a measurement of a temperature outside of the vehicle.

9. The system according to claim 7, further comprising a fan configured to increase heat transfer from the exterior condenser to outside of the vehicle.

10. The system according to claim 9, wherein the controller is further configured to control the speed of the fan based on a measurement of a speed of the vehicle.

* * * * *